United States Patent [19]

Beall

[11] 3,997,352

[45] Dec. 14, 1976

[54] MICA-SPODUMENE GLASS-CERAMIC ARTICLES
[75] Inventor: George H. Beall, Big Flats, N.Y.
[73] Assignee: Corning Glass Works, Corning, N.Y.
[22] Filed: Sept. 29, 1975
[21] Appl. No.: 617,250
[52] U.S. Cl. .............................................. 106/39.7
[51] Int. Cl.$^2$ ...................... C03C 3/22; C03C 3/04
[58] Field of Search ................................. 106/39.7
[56] References Cited
UNITED STATES PATENTS

| 3,573,074 | 3/1971 | Duke et al. | 106/39.7 |
| 3,856,497 | 12/1974 | Hummel | 106/39.7 |
| 3,881,944 | 5/1975 | Beall et al. | 106/39.7 |

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

This invention is concerned with the production of glass-ceramic articles wherein phlogopite mica solid solution and beta-spodumene solid solution comprise the primary crystal phases. Such articles demonstrate good machineability characteristics along with low coefficients of thermal expansion, excellent thermal shock resistance, and relatively high refractoriness.

4 Claims, 1 Drawing Figure

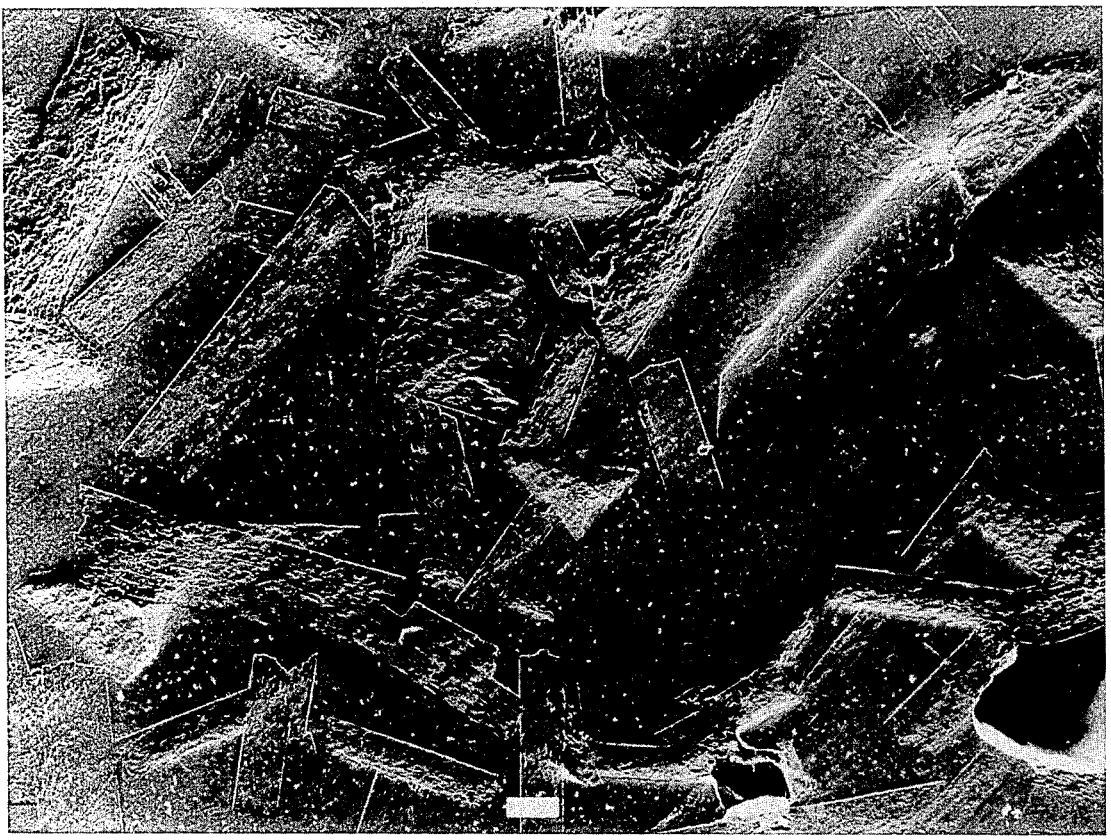

MICA-SPODUMENE GLASS-CERAMIC ARTICLES

A glass-ceramic article is derived from the controlled crystallization of a glass body through heat treatment thereof. Hence, the production of a glass-ceramic article normally involves three general steps. First a glass-forming batch, commonly containing a nucleating agent, is melted. Second, the melt is cooled sufficiently quickly to produce an essentially crystal-free glass body. Third, the glass body is heat treated in accordance with a particular time-temperature schedule to cause the body to crystallize in situ. This latter heat treatment practice generally contemplates two steps: (1) the glass is heated to a temperature in the vicinity of the annealing point to cause the development of nuclei therein; and (2) the temperature is raised to cause the growth of crystals on the nuclei.

Inasmuch as the crystallization in situ mechanism involves the substantially simultaneous growth of crystals on countless nuclei distributed throughout the glass body, the microstructure of a glass-ceramic article comprises relatively uniformly-sized, fine-grained crystals homogeneously dispersed, but randomly oriented, within a residual glassy matrix, the crystal phase constituting the predominant proportion of the article. Thus, glass-ceramic articles are normally at least 50% by weight crystalline and, in many instances, are actually more than 75% by weight crystalline. In view of this very high crystallinity, the chemical and physical properties of glass-ceramic bodies are commonly greatly different from those of the parent glass article. Hence, the properties will normally simulate those of the crystal phase. Finally, the residual glassy matrix will have a materially different composition from that of the parent glass since the components constituting the crystal phase will have been removed therefrom.

The fact that the manufacture of glass-ceramic articles is founded upon the crystallization in situ of glass articles permits such conventional glass-forming techniques as blowing, casting, drawing, pressing, rolling, spinning, etc., to be employed in obtaining articles of desired configurations and dimensions. Also, because of the residual glassy matrix present therein, a glass-ceramic article is free from voids and non-porous.

U.S. Pat. No. 2,920,971, the basic patent in the area of glass-ceramic production, provides an extensive discussion of compositional and process parameters along with certain theoretical considerations involved in the production of such articles. Reference is hereby made to that patent for a more detailed study of those factors as well as for an explanation of the crystallization mechanism. That patent defines a glass-ceramic body as being predominantly crystalline, i.e., greater than 50% by weight crystalline. As can be readily appreciated from a reading of the patent, the crystal phases developed in glass-ceramic articles are dependent upon the composition of the parent glass and the heat treatment applied thereto. Glass-ceramic articles containing beta-spodumene as the principal crystal phase are described therein utilizing $TiO_2$ as a nucleating agent.

The term "beta-spodumene" has been employed to designate a crystal that is now known to be in the trapezohedral class of the tetragonal system, that has the classic formula $Li_2O.Al_2O_3.4SiO_2$, and which is a high temperature form of alpha-spodumene resulting from heating the latter to a conversion temperature in the vicinity of 700° C. However, in the $Li_2O$—$Al_2O_3$—$SiO_2$ glass-ceramic materials, the crystal phase does not strictly conform to the naturally-occurring crystal. Instead, it is more in the nature of a solid solution corresponding generally to the formula $Li_2O.Al_2O_3.nSiO_2$, where $n$ may vary from about 3.5 up to 9 or more, depending upon the silica content of the parent glass. Nevertheless, an X-ray diffraction pattern invariably denotes a crystal in the tetragonal system. Accordingly, it has become customary, in identifying the crystal phases in glass-ceramic bodies, to define those $Li_2O$—$Al_2O_3$—$SiO_2$ crystals which are classifiable in the trapezohedral class of the tetragonal system as beta-spodumene solid solution (s.s.). That practice is followed here.

The micas comprise a family of minerals exhibiting a unique two-dimensional or sheet structure. Naturally-occurring micas are composed of large crystals which can be readily split into thicknesses of 0.001 inch or less. The flexibility and high dielectric strength displayed by sheet mica have promoted its widespread use as electrical insulating material.

Most naturally-occurring micas have hydroxyl silicate compositions whereas micas that have been produced synthetically have often involved substituting fluorine into the body structure in place of the hydroxyl groups. Thus, these synthetic micas have frequently been termed fluorophlogopite solid solutions or "fluormicas". Research efforts in the area of synthetic mica production can be categorized into five principal approaches: first, experiments to develop single crystals of fluormica; second, hot-pressed fluormica ceramics; third, glass-bonded fluormica ceramics; fourth, fusion cast mica materials; and fifth, fluormica glass-ceramics. The sum total of that research has been the finding that, whereas fine-grained, polycrystalline mica ceramics do not demonstrate the excellent flexibility of the single crystal micas, those products can, however, exhibit good dielectric behavior, thermal stability, and mechanical machineability.

The classic crystal structure of fluormica has been defined within the generalized structural formula $X_{0.5-1}Y_{2-3}Z_4O_{10}F_2$, wherein X represents cations which are relatively large in size, e.g., 0.9–1.6A radius, Y depicts somewhat smaller cations, e.g., 0.5–0.9A radius, and Z describes small cations, e.g., 0.25–0.5A radius, which coordinate to four oxygens. The X cations are in dodecahedral coordination and the Y cations in octahedral coordination. The fundamental unit of the mica structure is the $Z_2O_5$ hexagonal sheet resulting from the fact that each $ZO_4$ tetrahedron shares three of its corners with others in a plane. Thus, the structure of fluormica is similar to that of naturally-occurring mica in that two $Z_2O_5$ sheets, each having apical oxygens and associated interstitial fluoride ions directed toward each other, are bonded by the Y cations. The mica layer so-formed has been demonstrated to be a 2 to 1 layer since it is composed of two tetrahedral sheets with one octahedral sheet. The individual mica layers are bonded to each other through the relatively large X cations in the so-called interlayer sites.

The X cations are usually potassium but can be such other large alkali metal and alkaline earth metal cations as $Na^+$, $Sr^{+2}$, $Ba^{+2}$, $Rb^+$ and $Cs^+$. The Y cations can be $Li^+$, $Mg^{+2}$, and $Al^{+3}$. The Z cations will be $Si^{+4}$, $Al^{+3}$, and, perhaps $B^{+3}$.

One fundamental shortcoming inherent in all of the synthetic fluormicas (and in the naturally-occurring micas) has been the high coefficient of thermal expansion exhibited thereby, viz., greater than about 80 × $10^{-7}/°$ C., with consequent poor resistance to thermal shock. Therefore, there has been a need for a product demonstrating the good machineability character and dielectric properties of mica but with a much lower coefficient of thermal expansion. To fill that need is the prime objective of the present invention.

The attainment of that and other objectives is set out in the following description of the invention and the appended electron micrograph depicts the microstructure of the multiphase glass-ceramic article produced therefrom.

The present invention resides in the discovery that glass-ceramic articles containing synthetic fluormica as the primary crystal phase, which lends good machineability and electrical insulating properties thereto, can be produced wherein a substantial amount of beta-spodumene solid solution crystals is included to reduce the overall coefficient of thermal expansion of the articles. The articles are derived through the crystallization in situ of glass bodies consisting essentially, by weight on the oxide basis, of about 3–30% $R_2O$ + RO, wherein $R_2O$ consists of 0–10% $K_2O$ and/or $Na_2O$, and RO consists of 0–25% SrO and/or BaO, 1–5% $Li_2O$, 8–25% MgO, 10–25% $Al_2O_3$, 35–65% $SiO_2$, and 3–12% F. Where desired, the $K_2O$ and/or $Na_2O$ can be partly or wholly replaced on a molar basis with $Rb_2O$ and/or $Cs_2O$. Likewise, the SrO and/or BaO can be wholly or partially replaced on a molar basis with PbO. In sum, there is created a multiphase glass-ceramic body wherein each phase contributes distinctive characteristics to the overall glass-ceramic. The final crystal assemblage comprises fluormica solid solution and beta-spodumene solid solution crystals randomly oriented and homogeneously dispersed within a very minor amount of residual glass.

No nucleating agent as such is normally employed. The high content of MgO and F is adequate to allow amorphous phase separation and subsequent internal nucleation of both fluormica and spodumene solid solution. Thus, the inclusion of $TiO_2$ and/or $ZrO_2$, customarily utilized to nucleate beta-spodumene solid solution crystals in glass-ceramic articles, is not necessary and sometimes encourages the development of phases other than the desired fluormica. Therefore, whereas a minor addition of a nucleating agent may act to increase the overall crystallinity, but, concomitantly, decrease the crystal size of the final product, the general practice is to avoid such usage in the present invention.

Further, $B_2O_3$, an important ingredient in the crystallization of prior fluormica glass-ceramic bodies exhibiting good mechanical machineability (e.g., U.S. Pat. No. 3,689,293), is preferably absent from the present compositions due to its effect in raising the coefficient of thermal expansion and reducing the refractoriness thereof. Hence, in like manner to nucleating agents, while minor amounts of $B_2O_3$ can be tolerated, the preferred compositions are essentially free therefrom.

Minor additions of other oxides to the base glass composition, generally in amounts less than 5% individually and no more than 10% total, such as $P_2O_5$, CaO, CdO, $GeO_2$, FeO, and ZnO, can be tolerated and may act to improve melting and forming behavior or some physical property of the final product. As was noted above, $Na_2O$ can replace potassium ions in the fluormica structure. However, the presence thereof has an adverse effect upon the dielectric properties of the final body so its use will normally be omitted where the material is to be utilized in applications where such properties are important. Therefore, whereas amounts up to about 10% have been employed and are beneficial in melting and forming, the preferred products for dielectric applications are essentially free therefrom.

Table I reports compositions, expressed in weight percent on the oxide basis, of thermally crystallizable glasses which, when exposed to the appropriate heat treatment procedure of this invention, can be crystallized in situ to relatively uniformly crystalline fluormica-spodumene glass-ceramic articles. The ingredients forming the actual glass batches can be any materials, either oxides or other compounds, which, on being melted together, are converted to the desired oxide compositions in the proper proportions. The batch components will be compounded, ballmilled together to aid in securing a homogeneous melt, and then melted in closed platinum crucibles for about 6 hours at temperatures ranging between about 1350°–1500° C. Thereafter, the melt will be poured onto a steel plate to form a circular patty about ½ inch thick and this patty immediately transferred to an annealer operating at about 650° C. Inasmuch as it is not known with which cations the fluoride is combined, it is simply reported as fluoride in accordance with conventional glass analysis practice. Volatilization of fluoride from the melt was quite low at the melting temperatures employed, analyses demonstrating losses below 25% and, frequently, of no more than 5%.

In general, the procedure of cooling the glass article to room temperature is followed in order to permit visual inspection of glass quality. Nevertheless, successful subsequent crystallization of the glass body does not demand that practice. All that is required is the cooling of the melt to at least within the transformation range thereof and thereafter subjecting the body to the proper heat treatment. The transformation range has been defined as that temperature at which a liquid melt is deemed to have been converted into an amorphous solid; that temperature commonly being held as lying in the vicinity of the annealing point of a glass. The glass articles of the present invention are crystallized in situ by being heated to temperatures within the range of about 950°–1200° C. The crystallization process is time-temperature related. Therefore, only brief exposure periods will be required at the higher temperatures, e.g., one-half hour or even less; whereas much longer periods of time will be employed at the cooler extremes, e.g. up to 24 hours or more.

The preferred crystallization procedure involves two steps: First, the glass article is heated to a temperature somewhat above the transformation range of the glass, i.e., a temperature between about 750°–900° C. and held within that range for a sufficient length of time to assure good nucleation; and, subsequently, the nucleated body is heated to a temperature within the crystallization range for a time sufficient to complete crystal growth. In this preferred practice, a nucleation period of about 1–6 hours and a crystallization heat treatment of about 1–8 hours are employed.

Although the above-described two-step heat treatment constitutes the preferred practice, various modifications in method can be envisioned. The important feature is utilizing a crystallization temperature between about 950°–1200° C.

As has been discussed above, the rate of crystal growth is dependent upon temperature. Hence, at temperatures slightly above the transformation range, crystal growth is quite slow and the glass body is subject to deformation. Therefore, the rate of heating the glass body at temperatures above the transformation range ought not to be so rapid that a growth of crystals sufficient to support the body is not given adequate time to occur. Heating rates of 10° C./minute and higher can be successfully employed where physical supports for the parent glass articles are provided to forestall deformation. However, heating rates of about 3°–5° C./minute are preferred since such will yield articles exhibiting very little, if any, deformation over the whole composition field operable in the invention. The use of the two-step preferred practice also helps to minimize deformation since substantial nucleation insures more rapid and uniform subsequent crystallization.

crystallized articles left therein to cool to room temperature. This practice has been designated "cooling at furnace rate". It has been estimated that the articles are cooled thereby at an average rate of about 3°–5° C./minute. Since the coefficient of thermal expansion of the crystallized products is less than about $50 \times 10^{-7}/°$ C., much more rapid rates of cooling can be used without hazarding cracking or breakage. However, the above practice is conventionally employed as a simple convenience.

Table II further records a visual description, the crystal phases observed as identified through X-ray diffraction analyses, and a semi-quantitative measure of machineability of each crystallized article. A machineability index was employed wherein cold rolled steel was assigned a value of 78, aluminum a value of 32, and

TABLE I

|  | 1 | 2 | 3 | 4 | 5 | 6 | 7 | 8 |
|---|---|---|---|---|---|---|---|---|
| $SiO_2$ | & 53.5 | & 53.3 | & 59.4 | & 53.8 | & 57.7 | & 50.3 | & 56.7 | & 50.6 |
| $Al_2O_3$ | 12.9 | 13.2 | 15.1 | 13.0 | 14.8 | 12.9 | 14.4 | 13.2 |
| MgO | 18.5 | 18.7 | 13.9 | 18.5 | 13.5 | 20.0 | 15.6 | 18.5 |
| $Li_2O$ | 1.9 | 1.9 | 2.9 | 1.9 | 2.8 | 1.9 | 2.8 | 2.0 |
| $K_2O$ | 4.5 | & — | & — | 3.0 | & — | & — | & — | 2.5 |
| $Na_2O$ | 1.0 | & 4.1 | & 3.0 | 2.0 | & 2.9 | & 4.0 | & 2.9 | 2.4 |
| $TiO_2$ | & — | & — | & — | & — | 2.8 | 1.9 | & — | 3.7 |
| F | & 7.7 | 7.8 | & 5.7 | & 7.8 | 5.5 | 9.0 | & 7.6 | 7.1 |

|  | & 9 | & 10 | & 11 | & 12 | & 13 | & 14 | & 15 | & 16 |
|---|---|---|---|---|---|---|---|---|
| $SiO_2$ | & 53.2 | & 55.0 | & 46.8 | & 46.6 | & 43.4 | & 40.4 | & 47.8 | & 45.2 |
| $Al_2O_3$ | 16.1 | 17.5 | 13.7 | 20.9 | 13.0 | 20.3 | 21.7 | 13.5 |
| MgO | 16.9 | 13.2 | 19.7 | 11.5 | 14.6 | 14.3 | 12.7 | 15.2 |
| $Li_2O$ | 2.0 | 2.9 | 1.3 | 2.5 | 1.3 | 1.9 | 2.4 | 2.4 |
| $K_2O$ | 6.4 | 4.9 | & — | & — | & — | & — | & — | & — |
| SrO | — | & — | & — | — | — | — | & 10.8 | & 16.3 |
| BaO | — | — | & 12.4 | & 14.5 | & 22.1 | & 18.0 | & — | & — |
| F | & 5.4 | & 6.5 | 6.1 | 4.0 | 5.6 | 5.1 | & 4.6 | & 7.5 |

Following annealing, the glass patties from Table I will be transferred to an electrically-fired furnace and exposed to the heat treatment schedules reported in Table II. In each instance, the patty will be raised at the rate of about 5° C./minute to the recorded dwell temperature. At the completion of the heat treatment, the electric current to the furnace will be cut off and the brass a ranking of 15. Measurements of modulus of rupture and the coefficient of thermal expansion over the range of 25°–500° C. ($\times 10^{-7}/°$ C.) are reported where determined on individual products utilizing conventional measuring techniques. In the $Na_2O$-free articles, dielectric strengths at 25° C. of 2000–3000 volts/-mil are common.

TABLE II

| Example No. | Heat Treatment | Visual Description | Crystal Phases | Exp. Coeff. | Modulus of Rupture | Machineability |
|---|---|---|---|---|---|---|
| 1 | Heat to 800° C. Hold for 4 hours Heat to 1050° C. Hold for 4 hours | White, fine-grained, opaque, cherty fracture | Fluorophlogopite s.s., Beta-spodumene s.s | — | — | 50 |
| 2 | Ibid | Ibid | Ibid | 33 | 15,000 psi. | 50 |
| 3 | Ibid | Ibid | Ibid | — | — | 40 |
| 4 | Ibid | Ibid | Ibid | — | — | 50 |
| 5 | Ibid | Ibid | Fluorophlogopite s.s., Beta-spodumene s.s., Rutile | 34 | — | 50 |
| 6 | Ibid | Ibid | Fluorophlogopite s.s., Beta-spodumene s.s. | 50 | 20,000 psi. | 50 |
| 7 | Ibid | Ibid | Ibid | 38 | — | 50 |
| 8 | Ibid | Ibid | Ibid | — | — | 50 |
| 9 | Heat to 750° C. Hold for 2 hours Heat to 1100° C. Hold for 4 hours | Ibid | Ibid | — | — | 30 |
| 10 | Heat to 750° C. Hold for 2 hours Heat to 1050° C. Hold for 6 hours | Ibid | Ibid | 29 | 18,000 psi. | 50 |
| 11 | Heat to 750° C. Hold for 2 hours Heat to 1100° C. Hold for 4 hours | Ibid | Ibid | — | — | 70 |
| 12 | Ibid | Ibid | Ibid | — | — | 70 |
| 13 | Ibid | White, fine- | Fluorophlogopite | — | 22,000 psi. | 70 |

TABLE II-continued

| Example No. | Heat Treatment | Visual Description | Crystal Phases | Exp. Coeff. | Modulus of Rupture | Machineability |
|---|---|---|---|---|---|---|
| 14 | Ibid | grained, translucent, cherty fracture White, fine-grained, opaque, cherty fracture | s.s., Beta-spodumene s.s., Hexacelsian Ibid | — | — | 70 |
| 15 | Heat to 700° C. Hold for 4 hours Heat to 1050° C. Hold for 6 hours | Ibid | Fluorophlogopite s.s., Beta-spodumene s.s. | — | — | 50 |
| 16 | Ibid | Ibid | Ibid | — | — | 50 |

Table II illustrates the range of physical properties that the crystalline products of the present invention can possess. The microstructure of the glass-ceramic articles effectively determines the mechanical and electrical characteristics thereof. The articles are very highly crystalline, certainly greater than 70% and, in some instances, virtually 100%. The appended electron micrograph of Example 9 is illustrative of that fact, the white bar at the base of the photograph indicating a distance of one micron. The large plate-like or tabular crystals are fluormica which will exhibit a high aspect ratio, e.g., up to 4:1 and higher. The best machineability is secured at the highest concentrations of fluormica and wherein the fluormica crystals have a grain size of at least 3 microns and assume a very high aspect ratio, i.e., at least 4:1. Nevertheless, such bodies exhibit coefficients of thermal expansion of above $80 \times 10^{-7}/°$ C. Hence, the requirement for the presence of beta-spodumene solid solution crystals.

The appended electron micrograph clearly portrays the large fluormica crystals, the interstitial beta-spodumene solid solution crystals being extremely fine-grained and difficult to differentiate visually, i.e., such crystals having diameters less than about one micron. Nevertheless, the presence of beta-spodumene solid solution crystals is confirmed by X-ray diffraction analysis. Such crystals tend to harden the body and thereby impair the machineability character thereof. However, to achieve a coefficient of expansion of less than about $50 \times 10^{-7}/°$ C., it has been found that the beta-spodumene solid solution crystals should comprise at least about 25% of the total crystallinity. Larger amounts can, of course, be tolerated but the machineability index of such products appears to increase exponentially. Therefore, when the proportion of beta-spodumene solid solution crystals approaches 50%, the articles can no longer be considered readily machineable.

The mechanical strength exhibited by the crystallized articles is likewise dependent upon composition and microstructure. Thus, modulus of rupture values can range between about 10,000–25,000 psi, the higher strengths being achieved where the overall grain size of the crystals is small. The microstructure of the body also affects the strength thereof. Spherulitic or dendritic growths of mica result in the production of weak bodies. Contrarywise, an interlocking of the fluormica crystals, which can result when those crystals are present in large amounts and exhibit high aspect ratios, coupled with a relatively high percentage of fine-grained beta-spodumene solid solution, promotes the highest mechanical strength.

The resistance to thermal shock of these products is very exceptional. This is believed to be due to a combination of low coefficient of thermal expansion and the microstructure of the body. Thus, the singular interlocking microstructure of the plate-like or tabular fluormica crystals appears to allow adjustment to thermal expansion and shrinkage.

Likewise, the thermal stability of the crystalline articles is quite good. Hence, the absence of $B_2O_3$, a necessary component of U.S. Pat. No. 3,689,293, supra, permits the exposure of the articles to temperatures up to 1200° C.

Inasmuch as the dielectric properties are adversely affected by the presence of alkali metal oxides, especially $Li_2O$ and $Na_2O$, there is the desire to maintain these oxides at a low level. It is very apparent, however, that $Li_2O$ must be included in the batch to engender the development of beta-spodumene solid solution crystals. Therefore, the preferred glasses for such applications will contain less than 3% $Li_2O$, will have a minimum amount of $Na_2O$, and will include less than 6% $K_2O$. The substitution of $Rb_2O$ and/or $Cs_2O$ for $K_2O$ will improve the dielectric properties.

Electron microscopy and X-ray diffraction analyses have demonstrated the presence of very minor amounts of crystallization other than the desired fluormica and beta-spodumene solid solution. For example, hexacelsian ($BaO.Al_2O_3.2SiO_2$) was observed in Examples 13 and 14. Nevertheless, in those compositions containing such extraneous crystallization, the greatest amount thereof was estimated to constitute less than about 15% of the total crystallization present.

I claim:

1. A glass-ceramic article exhibiting good machineability and a coefficient of thermal expansion (25°–500° C.) less than about $50 \times 10^{-7}/°$ C. consisting essentially of interlocking plates of fluormica crystals and very fine-grained beta-spodumene solid solution crystals dispersed within a glassy matrix, said fluormica crystals comprising at least 50% of the total crystallization and having a grain size of at least 3 microns with a crystalline aspect ratio of at least 4:1, and said beta-spodumene solid solution crystals comprising at least 25% of the total crystallization and having a grain size less than about one micron, the sum of said crystals constituting at least 70% by volume of the article and being formed through the crystallization in situ of a glass body consisting essentially, by weight on the oxide basis, of about 3–30% $R_2O + RO$, wherein $R_2O$ consists of 0–10% $K_2O$ and/or $Na_2O$, and RO consists of 0–25% SrO and/or BaO, 1–5% $Li_2O$, 8–25% MgO, 10–25% $Al_2O_3$, 35–65% $SiO_2$, and 3–12% F.

2. A glass-ceramic article according to claim 1 exhibiting excellent electrical properties wherein said glass body contains less than 6% $K_2O$, less than 3% $Li_2O$, and is essentially free from $Na_2O$ and $B_2O_3$.

3. A glass-ceramic article according to claim 1 wherein said $K_2O$ and/or $Na_2O$ is wholly or partly replaced on a molar basis with $Rb_2O$ and/or $Cs_2O$.

4. A glass-ceramic article according to claim 1 wherein said SrO and/or BaO is wholly or partly replaced on a molar basis with PbO.

* * * * *

UNITED STATES PATENT AND TRADEMARK OFFICE
CERTIFICATE OF CORRECTION

PATENT NO. : 3,997,352
DATED : December 14, 1976
INVENTOR(S) : George H. Beall

It is certified that error appears in the above-identified patent and that said Letters Patent are hereby corrected as shown below:

Columns 5 and 6, Table I, delete all ampersands (&).

Signed and Sealed this

Twenty-second Day of March 1977

[SEAL]

Attest:

RUTH C. MASON
*Attesting Officer*

C. MARSHALL DANN
*Commissioner of Patents and Trademarks*